United States Patent [19]

Wallace

[11] 4,228,055
[45] Oct. 14, 1980

[54] AQUEOUS COATING COMPOSITIONS CONTAINING FLATTING AGENTS AND LOW MOLECULAR WEIGHT POLYETHERS

[75] Inventor: David R. Wallace, Pittsburgh, Pa.

[73] Assignee: PPG Industries, Inc., Pittsburgh, Pa.

[21] Appl. No.: 940,045

[22] Filed: Sep. 6, 1978

[51] Int. Cl.² ................. C08L 61/10; C08L 61/28
[52] U.S. Cl. .................. 260/29.3; 260/29.4 UA; 428/460; 525/143
[58] Field of Search ......... 260/29.4 UA, 29.3, 29.4 R, 260/844, 856; 525/143

[56] References Cited

U.S. PATENT DOCUMENTS

| | | | |
|---|---|---|---|
| 3,627,713 | 12/1971 | Maruta et al. | 260/15 |
| 3,839,253 | 10/1974 | Kershaw et al. | 260/29.6 R |
| 3,928,272 | 12/1975 | Brancato et al. | 260/29.4 R |
| 3,943,080 | 3/1976 | Wismer | 260/29.4 UA |
| 3,959,202 | 5/1976 | Blank | 260/29.4 UA |
| 4,062,821 | 12/1977 | Haag et al. | 260/29.4 UA |
| 4,137,205 | 1/1979 | Berenschot et al. | 260/29.4 UA |

Primary Examiner—Theodore E. Pertilla
Attorney, Agent, or Firm—Charles R. Wilson

[57] ABSTRACT

Aqueous coating compositions consist essentially of: (a) a water-insoluble film-forming polymeric resin; (b) water-insoluble agglomerated particulate beads of urea, melamine or phenol and formaldehyde; (c) polyethers having the formula $$H(OC_xH_{2x})_nOH$$

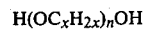

where x is from 2 to 4 and n is a number such that the polyether has a weight average molecular weight of from about 200 to about 1000; (d) pigments; and (e) water. The aqueous coating compositions are especially useful for imparting to metal coil a low gloss pigmented protective finish having good metal marking resistance.

13 Claims, No Drawings

AQUEOUS COATING COMPOSITIONS CONTAINING FLATTING AGENTS AND LOW MOLECULAR WEIGHT POLYETHERS

BACKGROUND OF THE INVENTION

The subject invention relates to aqueous coating compositions. More particularly, it relates to aqueous coating compositions capable of giving a low gloss pigmented protective finish to metal coil.

Metal coil coating compositions based on polymeric film-forming materials are well known. Such compositions typically contain a film-forming material for providing a protective finish, flatting agents for imparting a desired degree of gloss and pigments. Most prior art compositions formulated for use on metal coil have been organic solvent based. However, in recent years there has been a desire to reduce or eliminate the content of organic solvents in coating compositions. Part of the reason for this has been because of the high cost of the organic solvent itself, as well as the high cost of equipment needed to remove the organic solvent from the surrounding atmosphere following a coating operation.

There is a need for aqueous coating compositions capable of giving the same set of desired properties as an organic solvent based composition. One particular problem encountered with aqueous coating compositions in the field of metal coil coating has been metal marking. Metal marking is the undesired phenomenon observed during fabrication of coated metal coils. The intentional or accidental sliding of one coated metal coil over another coated metal coil (for example, during the installation of aluminum siding on a house) often times will leave a dark mark which is difficult to remove. Metal coil coated with organic solvent based coating compositions have not been adversely affected by a metal marking problem; this is because of the fact that polymeric film formers used are capable of adequately protecting the metal coil. Metal marking has been observed to be much more acute with aqueous coating compositions, and in particular with latex coating compositions. It is believed the metal marking results from conventional flatting agents and pigments typically included in the coating compositions. Because of the way a latex film is formed, the pigment particles and flatting agents protrude through the surface of the formed film and, in effect, act as abradants. Films formed from organic solvent based compositions appear to form in such a manner that the pigments and flatting agents are buried within the film and do not protrude through the surface, thereby lessening the tendency of metal marking.

Various attempts have been made to eliminate or reduce the metal marking resistance observed with aqueous coating compositions used on metal coil. Attempts at reducing the pigment particle size, as well as using less hard flatting agents, have not been fully successful.

There have now been found aqueous coating compositions containing film former, flatting agent and pigment, which are capable of providing a protective finish to metal coil without the problem of metal marking.

As used herein, all percentages and ratios are by weight unless otherwise indicated.

SUMMARY OF THE INVENTION

Aqueous coating compositions useful for imparting to metal coil a low gloss pigmented protective finish having good metal marking resistance consist essentially of:

(a) from about 10 percent to about 50 percent of a water-insoluble film-forming polymeric resin;

(b) from about 0.5 percent to about 7 percent of flatting agent, said agent being water-insoluble agglomerated particulate beads having a gross particle diameter of from about 1 micron to about 60 microns, wherein said beads consist essentially of the reaction product of urea, melamine or phenol and formaldehyde having a molar ratio of the urea to the formaldehyde of from about 1:1 to about 6:1, a molar ratio of the melamine to the formaldehyde of from about 1:1 to about 1:4, and a molar ratio of the phenol to the formaldehyde of from about 1:1 to about 1:3;

(c) from about 0.5 percent to about 7 percent of polyether having the formula $H(OC_xH_{2x})_nOH$, wherein x is from 2 to 4 and n is a number such that the polyether has a weight average molecular weight of from about 200 to about 1000;

(d) from about 5 percent to about 40 percent of pigment; and (e) the balance water.

DETAILED DESCRIPTION OF THE INVENTION

The aqueous coating compositions described herein consist essentially of film-forming polymeric resins, flatting agents, specific polyethers, pigments and water. Each of the components is described in the following paragraphs.

Many different water-insoluble polymeric film-forming materials which are capable of forming a dispersion in water are useful here. The aqueous coating compositions consist essentially of from about 10 percent to about 50 percent, preferably from about 20 percent to about 35 percent, of the film-forming polymeric resin. Specific examples of the polymeric film-forming materials are acrylic resins, vinyl resins and mixtures thereof, as described more fully in the following paragraphs.

Useful film-forming polymeric resins are the acrylic resins which are the polymerized ester derivatives of acrylic acid and methacrylic acid. The resins contain the units

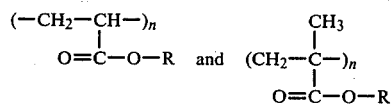

The esters are formed by the reaction of acrylic or methacrylic acid with suitable alcohols, e.g., methyl alcohol, ethyl alcohol, propyl alcohol, butyl alcohol and 2-ethylhexyl alcohol. Generally speaking, the larger the alcoholic portion of the ester, the softer or more flexible the resultant resin. Also generally speaking, the methacrylic esters form harder films than the corresponding acrylic esters. Monomers such as styrene, vinyl toluene, vinyl chloride and vinylidene chloride may be reacted with the acrylic and methacrylic esters so as to produce resins with excellent properties.

Thermosetting acrylic resins are normally low molecular weight copolymers made from two and sometimes three monomers. One of the monomers is an acrylic compound containing pendent reactive groups such as carboxyl, hydroxyl or amide. Another is an acrylic ester. The third monomer is usually a styrene-type monomer such as styrene itself, vinyl toluene, or alpha-methylstyrene. The proportions of the three components in the polymerization procedure are varied, depending on the products in which the copolymer will be used.

Many different copolymers of the aforedescribed monomers can be made. For example, copolymers of acrylic resins with each other or with other monomers of acrylic or methacrylic acid and their derivates such as methyl acrylate, methyl methacrylate, ethyl acrylate, ethyl methacrylate, butyl acrylate, butyl methacrylate, acrylamide and acrylonitrile are useful.

Other useful film-forming polymeric resins include the vinyl resins derived from monomers containing a carbon-to-carbon double bond. These monomers polymerize by linear addition to form long-chain molecules. Generally, the polymeric resins have the structure:

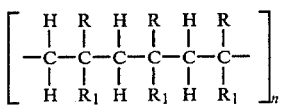

wherein R and $R_1$ represent various pendent groups such as hydrogen, chlorine, acetate, and aromatic groups. The vinyl resins are commonly derived from the monomers vinyl chloride, vinylidene chloride, vinyl acetate, styrene, acrylonitrile and mixtures thereof.

Copolymers derived from mixtures of any of the aforedescribed vinyl monomers, either with themselves or with other commonly used polymerizable monomers, are used herein. Such copolymers possess a wide range of properties and can be formulated to fit individual needs.

The water-insoluble polymeric resins have a particle diameter of less than about 1 micron, preferably from about 0.05 microns to about 0.5 microns and are suspended in water. Such compositions are oftentimes referred to as emulsions or latices. Conventional methods are used to form a stable suspension.

Another component of the aqueous coating compositions is a flatting agent in an amount ranging from about 0.5 percent to about 7 percent, preferably from about 1 percent to about 4 percent. The flatting agents used are water-insoluble, agglomerated particulate beads having a gross particle diameter of from about 1 micron to about 60 microns, preferably from about 5 microns to about 35 microns. The beads consist essentially of the reaction product of urea, melamine or phenol and formaldehyde. The molar ratio of the urea to the formaldehyde is from about 1:1 to about 6:1, preferably from about 2:1 to about 4:1. The molar ratio of the melamine to the formaldehyde is from about 1:1 to about 1:4, preferably from about 1:2 to about 1:3. The molar ratio of the phenol to the formaldehyde is from about 1:1 to about 1:3, preferably from about 1:2 to about 1:3.

The agglomerated particulate beads are available commercially. Alternatively, the beads based on the urea or phenol and formaldehyde can be prepared by the method described in U.S. Pat. No. 3,943,080, issued March 9, 1976 to Marco Wismer, Karl F. Schimmel and Rodger G. Temple, the disclosure of which is herein incorporated by reference. Thus, the particulate beads can be prepared by acidifying, while under agitation, an aqueous mixture of urea or phenol and formaldehyde in the presence of a protective colloid-forming material. The mixture is then polymerized so that particulate beads are formed in the presence of the protective colloid while the mixture is under agitation. The particulate beads are agglomerated to the desired gross particle size, collected and, if desired, dried. Other suitable methods of making the particulate beads can be used.

It has been found the aforedescribed level of particulate beads and gross particle size are necessary in order to get the desired degree of flatting. Thus, a level of particulate beads below about 0.5 percent does not give a noticeable flatting effect, while a level above 7 percent does not give increased flatting effects and is for this reason avoided. The particle size of the particulate beads above mentioned is also necessary in order to get a resultant film having the desired physical characteristics. Thus, a particulate bead diameter of greater than about 60 microns is avoided because of the adverse affect it has on the film's integrity.

The aqueous coating compositions also consist essentially of from about 0.5 percent to about 7 percent, preferably from about 1 percent to about 3 percent of a polyether having the formula $$H(OC_xH_{2x})_nOH$$

wherein x is from 2 to 4 and n is a number such that the polyether has a weight average molecular weight of from about 200 to about 1000. The aforedescribed polyethers include polyethylene glycol, polypropylene glycol and polytetramethylene glycol. These materials are all commercially available. A preferred weight average molecular weight range for the polyether is from about 300 to about 700. It has been found the addition of the polyether to the aqueous coating compositions has a very beneficial effect on the metal marking resistance of the resultant coated metal coil. In the absence of the inclusion of such a polyether in the composition, the metal marking resistance is unsatisfactory. It is theorized the low molecular weight polyether migrates to the surface of the coating during baking and forms a crosslinked polymer network which prevents the abrasive pigment from showing at the surface and causing the metal marking. Particularly important is the fact the polyether has a low molecular weight within the range above indicated. Polyethers of a higher molecular weight do not possess the ability of improving the metal marking resistance of the coated metal coils.

Pigments are included in the aqueous coating compositions at a level ranging from about 5 percent to about 40 percent, preferably from about 15 percent to about 25 percent. Pigments useful herein include those conventionally used in the coatings industry. Examples of suitable pigments include the iron oxides, lead chromates, china clay, calcium carbonate, silica, zinc oxide, titanium dioxide, chrome green, chrome yellow, phthalo-green, phthalo-blue, cobalt blue, cadmium yellow, cadmium red, and carbon black.

The balance of the composition is water. Optionally, a minor amount of an organic solvent can be included in the composition. The amount of organic solvent included in the composition comprises less than about 10 percent, preferably less than about 5 percent of the composition. Suitable organic solvents include aromatic and aliphatic hydrocarbons; glycols, e.g. ethylene glycol and propylene glycol; glycol ethers, e.g. ethylene glycol monoethyl ether, ethylene glycol monobutyl ether and diethylene glycol monobutyl ether; ketones, e.g. methyl ethyl ketone; and alcohols, e.g. ethanol, propanol and butanol.

Various other additives commonly used in coating compositions can be used herein also. Such additives include plasticizers, surfactants, defoamers, lubricants, levelling agents, and stabilizers.

The aqueous coating compositions are especially useful for coating metal coil, such as aluminum siding. The resultant coatings are durable and are resistant to metal marking. The compositions can also be applied to other substrates, such as wood, glass, plastics and wallboard. The manner of coating is not important. Suitable methods include spraying, brushing, dipping, flow coating and roll coating.

The Examples which follow are illustrative of the invention.

EXAMPLE I

This example illustrates the advantages of the invention when a polyether is included in a coating composition and used for coating metal coil.

A pigment paste of the following components is made:

|  | % |
|---|---|
| Acrylic resin[1] | 11.8 |
| Dimethylethanolamine | 0.7 |
| Deionized water | 4.3 |
| Defoamer[2] | 0.4 |
| Diethylene glycol monobutyl ether | 3.6 |
| Ethylene glycol | 7.2 |
| Titanium dioxide | 72.0 |

[1]Available from Rohm & Haas Co. Acrysol I-94
[2]Available from Drew Chem. Co. as L-475.

Coating compositions using the above pigment paste contain the following components:

|  | % | |
|---|---|---|
|  | A | B |
| Pigment paste | 32.9 | 33.7 |
| Acrylic emulsion[3] | 60.5 | 61.7 |
| Defoamer | 0.3 | 0.3 |
| Polypropylene glycol (M.W. = 425) | 2.1 | — |
| Urea/formaldehyde (2:1, average particle diameter of 8 microns) | 4.2 | 4.3 |

[3]Containing 46.5 percent solids and available from Rohm & Haas Co. as AC-1230.
[4]Available from Balab as Bubble Breaker #3056-A.

Compositions A and B are separately applied to metal panels and baked to a peak metal temperature of 215° C. with a dwell time of 1 minute or less to give a dry film of about 0.8 mils thickness. Each coating provides a low gloss durable finish on the metal coil. However, when metal marking resistance is tested by rubbing a coin over each of the coated surfaces, the metal panel coated with Composition A shows very little marking, while that coated with Composition B shows a noticeable and objectionable dark streak.

EXAMPLE II

This example illustrates the advantages of metal marking resistance in using a urea/formaldehyde resin and a polyether versus the use of a conventional silica flatting agent and a polyether.

A pigment paste for use in the compositions of this invention is made by blending the following materials:

|  | % |
|---|---|
| Acrylic resin[1] | 4.6 |
| Dimethylethanolamine | 0.6 |
| Melamine resin[2] | 7.3 |
| Titanium dioxide | 68.9 |
| Ethylene glycol monoethyl ether | 3.3 |
| Ethylene glycol | 12.2 |
| Diethylene glycol monobutyl ether | 3.1 |

[1]A water-insoluble resin made from an 80:10:10 ratio of isobutyl methacrylate, hydroxyethyl acrylate and acrylic acid.
[2]Available from American Cyanamid as Cymel 303.

The above components are blended on a Cowles mixer for about 20 minutes to form a uniform pigment paste. Next, a coating composition is made using the pigment paste by blending the following components:

|  | % | |
|---|---|---|
|  | A | B |
| Pigment paste | 38.7 | 38.7 |
| Acrylic emulsion[3] | 55.0 | 55.0 |
| Defoamer[4] | 0.3 | 0.3 |
| Polyethylene glycol (M.W. = 300) | 2.0 | 2.0 |
| Urea/formaldehyde (2:1, average particle diameter of 8 microns) | 4.0 | — |
| Silica (average particle diameter of 7 microns) | — | 4.0 |

[3]The emulsion comprises 45 percent solids in water of an acrylic polymer of butyl acrylate, methyl methacrylate, hydroxypropyl methacrylate and acrylic acid, 47:47:4:2.
[4]Available from Balab Chem. Co. as Bubble Breaker #3056-A.

Metal panels are coated as in Example I with each of the compositions. Each composition provides a low gloss durable finish. The metal marking resistance of the panel coated with Composition A is satisfactory as measured by the test given in Example I. However, the metal marking resistance of the panel coated with Composition B is unsatisfactory as evidenced by a dark, permanent streak where the coin has been rubbed.

EXAMPLE III

Coating compositions are formulated in the manner of Examples I and II wherein polyethers of different molecular weight are used in order to show the importance of the molecular weight on the metal marking resistance imparted to metal coil coated with the compositions.

|  | A | B | C | D | E | F | G |
|---|---|---|---|---|---|---|---|
| Pigment paste[1] | 38.7 | 38.7 | 38.7 | 38.7 | 38.7 | 38.7 | 38.7 |
| Acrylic emulsion[2] | 57.0 | 55.0 | 55.0 | 55.0 | 55.0 | 55.0 | 55.0 |
| Defoamer[3] | 0.3 | 0.3 | 0.3 | 0.3 | 0.3 | 0.3 | 0.3 |
| Polyethylene glycol (M.W. = 300) | — | 2.0 | — | — | — | — | — |
| Polyethylene glycol (M.W. = 6000) | — | — | 2.0 | — | — | — | — |
| Polypropylene glycol (M.W. = 425) | — | — | — | 2.0 | — | — | — |
| Polypropylene glycol (M.W. = 4000) | — | — | — | — | 2.0 | — | — |
| Polytetraethylene glycol (M.W. = 650) | — | — | — | — | — | 2.0 | — |
| Polytetraethylene glycol (M.W. = 2000) | — | — | — | — | — | — | 2.0 |
| Urea/formaldehyde (2:1, average particle diameter | 4.0 | 4.0 | 4.0 | 4.0 | 4.0 | 4.0 | 4.0 |

-continued

| | A | B | C | D | E | F | G |
|---|---|---|---|---|---|---|---|
| of 8 microns) | | | | | | | |

(1)Same pigment paste used in Example II
(2)Same acrylic emulsion used in Example II
(3)Same defoamer used in Example II Each of the compositions is separately applied to metal panels and evaluated for metal marking resistance in the manner given in Example I. Values ranging from 0 (no metal marking) to 10 (very dark streak) with 3 being marginably acceptable are assigned as follows:

| Composition | Metal Marking Resistance |
|---|---|
| A | 6 |
| B | 1 |
| C | 7 |
| D | 2 |
| E | 4 |
| F | 1 |
| G | 5 |

Compositions of this invention, (Compositions B, D and F) all impart acceptable metal marking resistance while the control (Composition A) and compositions containing polyethers of molecular weights outside the range found to be important (Compositions C, E and G) all impart unacceptable metal marking resistance to the coated metal panels.

The following examples are further illustrations of the compositions of this invention. Each composition provides the advantages of the invention, i.e. provides a low gloss durable coating with enhanced metal marking resistance.

EXAMPLE IV

Another pigment paste has the following composition:

| | % |
|---|---|
| Acrylic resin(1) | 3.2 |
| Dimethylethanolamine | 0.3 |
| Ethylene glycol | 9.6 |
| Diethylene glycol monobutylether | 3.2 |
| Defoamer(2) | 0.6 |
| Melamine resin(3) | 3.2 |
| Deionized water | 9.6 |
| Titanium dioxide | 70.3 |

(1)Available from Nopco Chem. Co. as Nopcosant.
(2)Available from Drew Chem. Co. as L-475.
(3)Available from American Cyanamid as Cymel 303

A coating composition containing the above pigment paste has the following composition:

| | % |
|---|---|
| Pigment paste | 34.6 |
| Acrylic emulsion(4) | 59.4 |
| Defoamer(5) | 0.3 |
| Polytetraethylene glycol (M.W. = 650) | 2.0 |
| Urea/formaldehyde (2:1, average particle size of 8 microns) | 3.7 |

(4)Containing 43 percent solids and available from Union Carbide Corp., as UCAR 4620X
(5)Available from Daniel Products as Dapro 880

EXAMPLE V

Another coating composition contains the following components:

| | % |
|---|---|
| Pigment paste of Example II | 33.8 |
| Acrylic emulsion(1) | 54.0 |
| Melamine resin(2) | 6.1 |
| Defoamer(3) | 0.3 |
| Polyethylene glycol (M.W. = 400) | 2.2 |
| Urea/formaldehyde (2:1, average particle diameter of 8 microns) | 3.6 |

(1)Containing 49 percent solids and available from Air Products Co. as Airflex 6514
(2)Available from American Cyanamid as Cymel 303
(3)Available from Daniel Products as Dapro 880

The above examples are illustrative of the coating compositions of the invention. The compositions impart low gloss, pigmented, durable finishes to substrates. The coated panels all possess good metal marking resistance.

What is claimed is:

1. An aqueous coating composition useful for imparting to metal coil a low gloss pigmented protective finish having good metal marking resistance, said composition consisting essentially of:
   (a) from about 10 percent to about 50 percent of a water-insoluble film-forming acrylic resin, vinyl resin or mixture thereof;
   (b) from about 0.5 percent to about 7 percent of flatting agent, said agent being water-insoluble agglomerated particulate beads having a gross particle diameter of from about 1 micron to about 60 microns, wherein said beads consist essentially of the reaction product of urea, melamine or phenol and formaldehyde having a molar ratio of the urea to the formaldehyde of from about 1:1 to about 6:1, a molar ratio of the melamine to the formaldehyde of from about 1:1 to about 1:4, and a molar ratio of the phenol to the formaldehyde of from about 1:1 to about 1:3;
   (c) from about 0.5 percent to about 7 percent of polyether having the formula $H(OC_xH_{2x})_nOH$, wherein x is from 2 to 4 and n is a number such that the polyether has a weight average molecular weight of from about 300 to about 700;
   (d) from about 5 percent to about 40 percent of pigment; and
   (e) the balance water.

2. The aqueous coating composition of claim 1, wherein the film-forming resin is an acrylic resin having a particle diameter of less than about 1 micron.

3. The aqueous coating composition of claim 2 wherein the polyether is a polyethylene glycol.

4. The aqueous coating composition of claim 2, wherein the polyether is a polypropylene glycol.

5. The aqueous coating composition of claim 2, wherein the polyether is a polytetramethylene glycol.

6. The aqueous coating composition of claim 1, wherein the flatting agent is the reaction product of urea and formaldehyde.

7. The aqueous coating composition of claim 6, wherein the molar ratio of the urea to the formaldehyde is from about 2:1 to about 4:1.

8. The aqueous coating composition of claim 1, wherein the flatting agent is the reaction product of melamine and formaldehyde.

9. The aqueous coating composition of claim 8, wherein the molar ratio of the melamine to the formaldehyde is from about 1:2 to about 1:3.

10. The aqueous coating composition of claim 1, wherein the flatting agent is the reaction product of phenol and formaldehyde.

11. The aqueous coating composition of claim 10 wherein the molar ratio of the phenol to the formaldehyde is from about 1:2 to about 1:3.

12. The aqueous coating composition of claims 7, 9 or 11 wherein the gross particle diameter of the beads is from about 5 microns to about 35 microns.

13. The aqueous coating composition of claim 2 consisting essentially of:
 (a) from about 20 percent to about 35 percent of the film-forming resin;
 (b) from about 1 percent to about 4 percent of the flatting agent;
 (c) from about 1 percent to about 3 percent of the polyether;
 (d) from about 15 percent to about 25 percent of the pigment; and
 (e) the balance water.

* * * * *